United States Patent [19]

Belisle et al.

[11] Patent Number: 5,456,338
[45] Date of Patent: Oct. 10, 1995

[54] BRAKE DRUM PROVIDING ACCESS TO BRAKE ADJUSTER

[75] Inventors: Duane J. Belisle, Elkhart, Ind.; March H. Durren, St. Joseph, Mich.

[73] Assignee: Tomkins Industries, Inc., Dayton, Ohio

[21] Appl. No.: 231,401

[22] Filed: Apr. 22, 1994

[51] Int. Cl.⁶ ............................................. F16D 63/66
[52] U.S. Cl. ............................. 188/79.61; 188/79.51
[58] Field of Search .......................... 188/79.31, 78, 188/18 A, 138, 156, 196 R, 196 BA, 196 D, 325, 326, 328, 79.61; 301/6.6, 6.7

[56] References Cited

U.S. PATENT DOCUMENTS

| | | | |
|---|---|---|---|
| 2,273,065 | 2/1942 | Penrose | 188/138 |
| 2,304,118 | 12/1942 | Phair | 188/138 |
| 2,978,072 | 4/1961 | Burnett | 188/79.61 |
| 4,004,663 | 1/1977 | Stibbe | 188/138 |
| 4,159,832 | 7/1979 | Inbody | 188/18 A |
| 4,321,844 | 3/1982 | Kvill | 188/79.61 |
| 4,363,384 | 12/1982 | Richardson et al. | 188/18 A |
| 4,922,771 | 5/1990 | Campbell | 81/484 |
| 5,322,145 | 6/1994 | Evans | 188/106 A |

*Primary Examiner*—Robert J. Oberleitner
*Assistant Examiner*—Chris Schwartz
*Attorney, Agent, or Firm*—Biebel & French

[57] ABSTRACT

An improved drum brake assembly in which brake shoes are mounted on a backing plate and coact with a rotating brake drum mounted on an axle and in which a mechanical brake adjuster has a movable component for adjusting the running clearance of the brake shoes, in which the brake drum has an adjustment access opening formed in its generally radial portion and in spaced relation to the brake backing plate. This access opening is alignable with the movable component of the brake adjuster by rotating the brake drum on the axle so as to position the access opening in opposed relation to the position of the movable component. The access opening is sized so as to provide for the insertion of a brake adjusting tool from a position adjacent the lateral side of the drum to engage the movable component, for the purpose of adjusting the shoes, and obviating the necessity of moving under the vehicle to access the movable component through the conventional access hole formed in the backing plate. The access opening is formed as an arcuately elongated slot, the long walls of which provide a convenient pry surface for the brake adjusting tool.

5 Claims, 3 Drawing Sheets

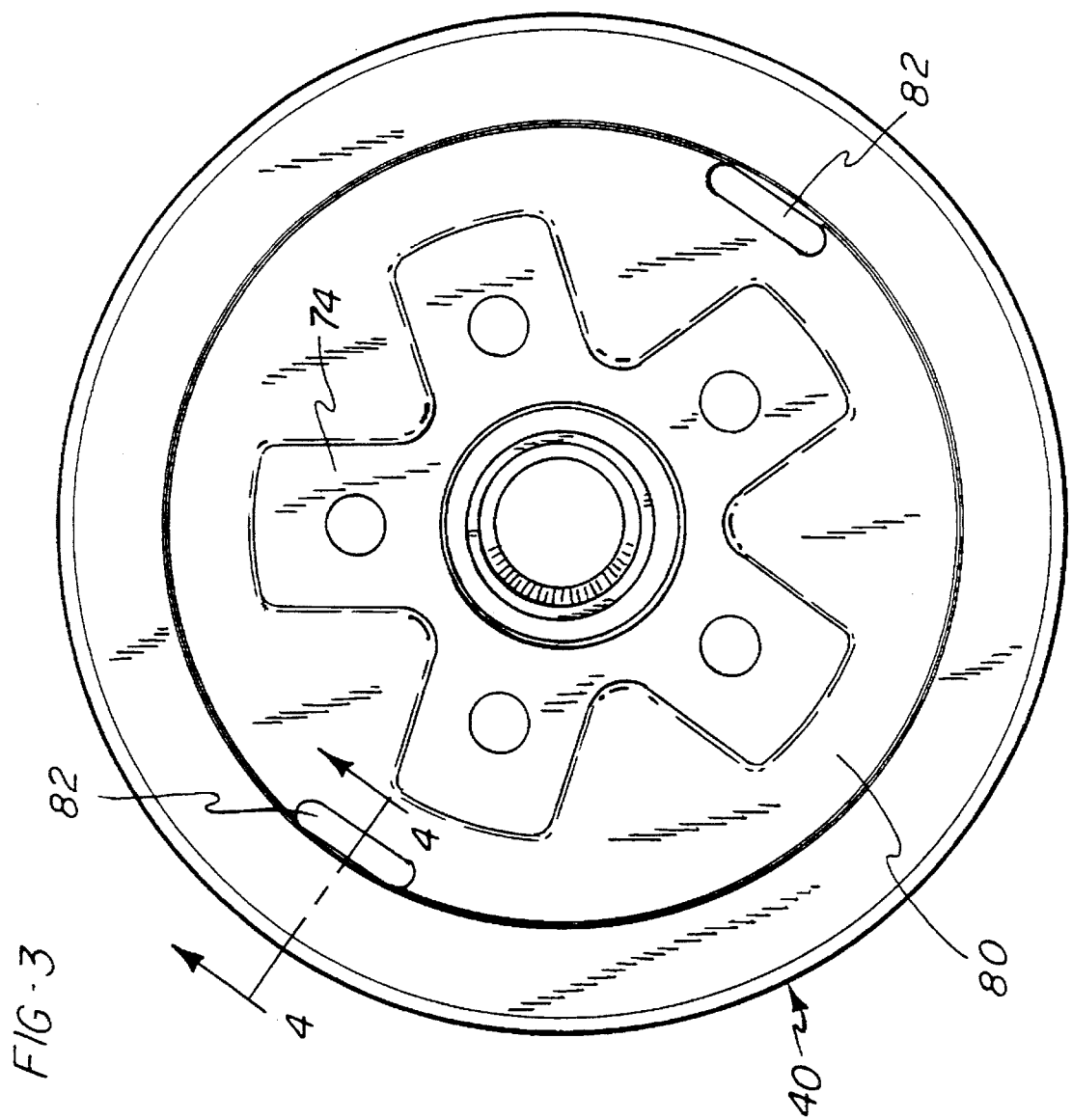
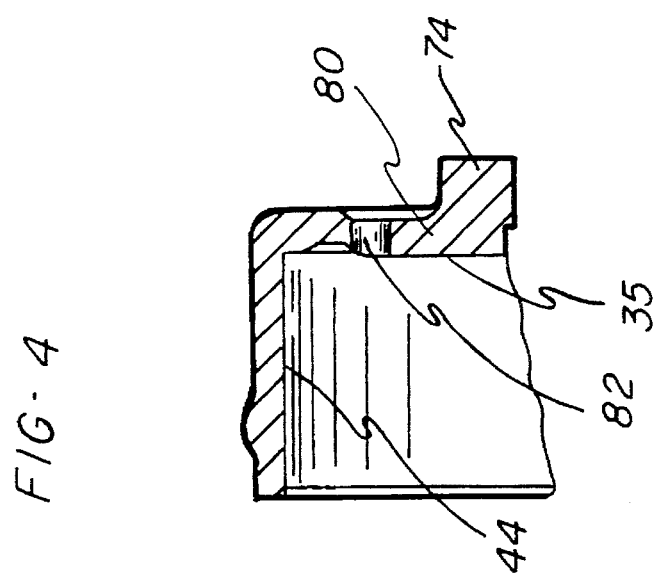

BRAKE DRUM PROVIDING ACCESS TO BRAKE ADJUSTER

BACKGROUND OF THE INVENTION

This invention pertains to drum-type brakes, and more particularly to drum-type brakes which incorporate a manually operable brake adjuster mechanism.

Drum-type brakes continue in extensive use on utility vehicles, particularly on utility trailers, mobile homes and boat trailers. Such drum brakes include electrical actuation, hydraulic surge-hitch actuators, pneumatic or mechanical actuators, or combinations or hybrids of these. Typically, an extensible mechanical adjuster is fitted between the adjacent non-actuated ends of the brake shoes. These ends are coupled by a tension spring against the adjuster, and the adjuster controls the running clearance between the brake shoes and the brake drums.

The adjuster commonly employs an adjustable component in the form of a rotatable notched or star wheel. This wheel is accessible through a plugged or stoppered opening formed in the brake backing plate, so that rotation in a given direction causes the running clearance to be reduced between the friction material on the brake shoe and the inside cylindrical braking surface of the drum.

Safe brake operation requires periodic manual brake adjustments to maintain proper brake operation and enhance vehicle safety. When the mechanical adjuster is not properly adjusted from time to time, the available brake actuation, such as by an electromagnet torque arm or hydraulic piston, can exceed the available stroke of the actuator and the brake will become unsafe or inoperative. The existing arrangements require that such manual adjustment be accessed by inserting a tool through the access hole formed in the backing plate. These arrangements have proved to be an inconvenience, a potential safety hazard, and a deterrent to brake maintenance.

There is the inconvenience of having to go beneath a vehicle for the purpose of adjusting the brakes, and this inconvenience results in fewer brake adjustments. Since it is necessary to jack the vehicle off the pavement or put it on a lift prior to adjustment, this condition presents the hazard of having to go under or reach under a vehicle which is so supported and work on the brakes from that position. Also, since owners and users often improvise their own brake maintenance, the risk of injury due to the unsafe operation of jacking equipment is real.

A large number of utility trailers and other vehicles which use manually adjustable brakes are built with drop spindles. A drop spindle is an axle which has a spindle portion which is elevated with respect to a transaxle portion, for the purpose of lowering the trailer frame and springs to a lower center of gravity. An example of an offset or drop spindle is shown in the Foster U.S. Pat. No. 4,127,306.

The spindle offset together with the closely surrounding frame of the vehicle substantially block access to the brake adjusting access hole conventionally formed in the backing plate. This lack of clear access is a further deterrent to one contemplating the adjustment of such brakes, and makes more difficult and dangerous the act of working underneath such a vehicle which has been jacked up or elevated for the purpose of brake adjustment.

There is therefore a need to provide a brake adjustment feature which is move readily accessible, both to trailer owners and to professionals, to encourage more frequent maintenance and provide less hazardous brake adjustment procedures. At the same time, such an improved access can provide improved visibility to enable accurate adjustments in less time.

SUMMARY OF THE INVENTION

This invention is directed to an improved brake drum providing direct access to a mechanical brake adjuster and eliminating the necessity for crawling or moving under an elevated or jacked-up vehicle for the purpose of brake adjustments, permitting brake adjustments from a comfortable safe lateral position, a position which is similar to that which is assumed when putting air into the vehicle tire, and providing improved visibility and ease of brake adjustment.

In the realization of this invention, one or more brake adjuster access holes or slots are formed through the radial portion of the brake drum in non-interfering relation to the wheel mounting bolt circle or to any radial strengthened boss which is commonly part of the brake drum. The adjuster slot is located at a radial position which, upon rotation of the wheel on the axle, will bring the slot into opposed relation to the adjuster components, thereby providing access for an adjuster tool to engage the mechanical adjuster mechanism. The radial width of the slot is such that a wall of the slot forms a pry surface, so that the star wheel of the conventional adjuster may be rotated with mechanical advantage by using the adjuster tool as a pivoted lever.

While the brake should be adjusted with the wheel off of the ground, the person making the adjustment is not required to reach under the vehicle. Further, in most cases, such person will be able to make the adjustment through one of the trim or design openings commonly formed in a pressed metal or a spoked wheel. Thus, the adjustment can be made without removing the wheel. This can be a further advantage to proper adjustment since the flywheel effect or mass of the assembled wheel and tire may be utilized in spinning the wheel and tire, during adjustment, to determine the accuracy and adequacy of the brake adjustment and to observe the degree of any drag on the drum.

While the drum access holes according to this invention may be plugged, in many instances it may be preferred to leave them open. Such holes will then promote an increase in air flow through the brake, thereby providing additional cooling to the brake. This feature enhances performance and increases the life of the brake shoes and, in the case of an electromagnet brake, the life of the magnet face. Further, the openings permit an owner to flush out the brake with fresh water after exposure to a corrosive environment, such as salt water. An intrusion of salt water can occur, for example, in the case of a boat trailer when the trailer is backed down a launching ramp and into the water when launching or picking up its boat.

It is accordingly an important object of the invention to provide an improved brake drum for mechanically adjustable brakes, providing one or more access openings for brake adjustment therethrough.

A further object of the invention is the provision of an improved brake drum combination with a mechanically actuated brake providing for brake adjustment from a position alongside the wheel without the necessity of reaching or moving under the vehicle.

A further object of the invention is the provision of a brake drum which has enhanced ventilating and air cooling properties.

These and other objects and advantages of the invention will be apparent from the following description, the accompanying drawings, and the appended claims.

BRIEF DESCRIPTION OF ACCOMPANYING DRAWINGS

FIG. 3 is an elevational view of a hub constructed according to this invention; and FIG. 4 is a fragmentary sectional view through the hub looking generally along the line 4—4 of FIG. 3.

DESCRIPTION OF PREFERRED EMBODIMENTS

Figure 1:
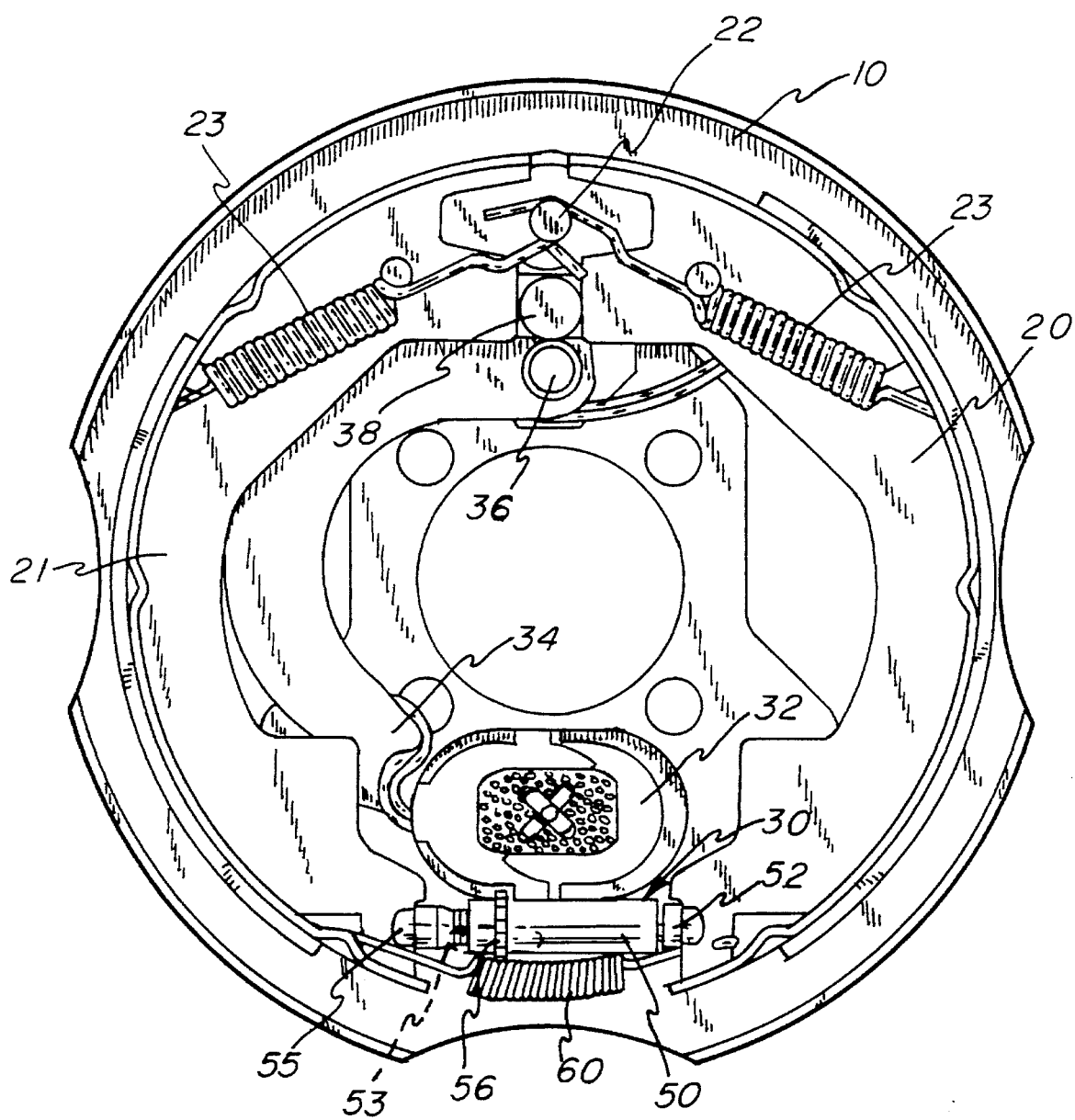
FIG. 1 is an end view of a brake mechanism including a mechanical adjuster on which this invention may be employed.
Figure 2:
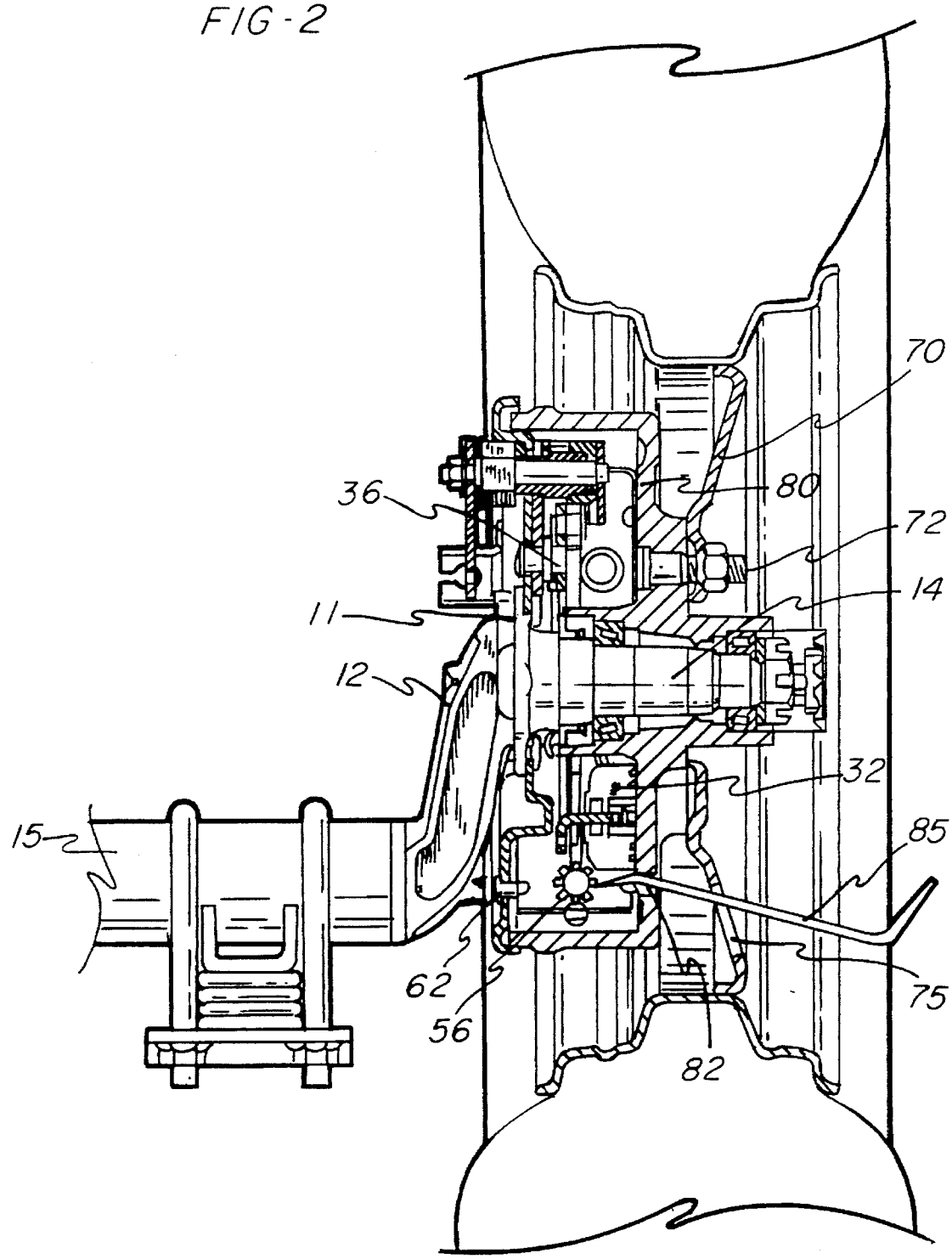
FIG. 2 is a sectional view through an axle mounted brake, hub and wheel combination in accordance with this invention.

Referring to FIGS. 1 and 2, an electric brake with mechanical adjustment is shown of the general type in which a magnet is supported on a magnet arm for brake actuation, as shown in Penrose U.S. Pat. No. 2,273,065 and Phair U.S. Pat. No. 2,304,118. A brake backing plate 10 (FIG. 1) is mounted by bolts 11 (FIG. 2) to the flange of an axle 12. The axle may be either a straight spindle or a drop spindle as previously described. In the view of FIG. 2, a drop spindle axle is shown in which the axle spindle 14 is offset upwardly from the axle cross member 15 for the purpose of lowering the bed of the vehicle or trailer.

A pair of brake shoes 20 and 21 are pivotally connected or attached with respect to the backing plate 10. Thus, the shoes 20 and 21 have their upper ends mounted at a support post 22 and retained by springs 23. Their lower ends are mounted and supported on a mechanical adjuster illustrated generally at 30.

The illustrated brake is of the electromagnetic type in which a magnet 32 is mounted on a torque arm 34 and has a running face which runs against an annular armature surface 35 of the drum 40 (FIGS. 3 and 4). When the magnet 32 is energized the increased drag on the surface 35 creates a torque on the arm 34 which causes the arm to rotate about a pivot 36. Force is applied to the shoes by the arm 34 through a toggle 38, and causes the brake shoes to spread into frictional engagement with the axial braking surface 44 of the drum 40.

As the brake lining wears down, the ability of the brake shoes to be actuated by the magnet arm 34 decreases since only limited swinging movement is provided for this arm, and it therefore becomes necessary to take up the excess slack by means of the mechanical adjuster 30. While the invention is described in terms of an electromagnetic brake, it should be understood that it can also be applied to any drum-type brake which has an internal mechanical adjuster which may be accessed through the brake drum.

The adjuster 30 is a three-piece unit including a socket 50 which has a forked end 52 received over and engaging the lower end of the shoe 20. The socket 50 is otherwise hollow to receive therein a threaded screw 53. The remote end of the screw 53 is also bifurcated or forked at 55 to receive the lower end of the opposite shoe 21.

A star nut 56 is threaded on the screw 53 and bears against the open end of the socket 50. The nut is formed with a star-shaped or lugged outer circumference by means of which the nut 56 may be rotated by a pry tool. Rotation of the nut 56 causes the non-rotating screw 53 to move axially of the nut from within the socket 50, so that the lower ends of the shoes are spread further apart. The adjuster 30 is held in place by a conventional tension spring 60 which interconnects the ends of the arms.

Traditionally, the star nut 56 has been accessed by a tool through a brake adjuster slot 62 formed in the backing plate 10. However, it can be readily seen in viewing FIG. 2 that the drop spindle 12 provides only limited access to this adjuster slot, and any access must be from a position underneath the vehicle when the vehicle is raised by a jack or by a lift.

The improved drum of this invention makes possible the adjustment of the nut 56 of the mechanical adjustment device 30 from a safe and comfortable position along side the wheel, usually without removing the wheel itself from the hub.

With reference to the sectional view of FIG. 2 and the elevational view of the hub in FIG. 3, the hub 40 is shown as supporting a conventional pressed steel wheel 70 on bolts 72 which are supported on enlarged bosses 74 of the hub. Conventionally, the wheel 70 will have a plurality of styling openings 75 at positions intermediate the centers of the bolts 72 in the bolt circle and also generally intermediate the bosses 74.

For the purpose of this invention, the hub, in the generally radial wall portion 80 thereof, is provided with one or more arcuately elongated access slots 82 which extend through the radial wall portion 80 at a region which does not substantially interfere with the armature surface 35 and which is offset from the centerline of any one of the bosses 74. In the preferred embodiment, the slots extend chordwise and normal to a radius to the axle. In a preferred embodiment, the slots subtend an arc of about 16°, and have a radial width of approximately 0.35 to 0.50 inch, to permit the insertion of a typical brake adjuster tool 85, as shown in FIG. 2.

The slot 82 is alignable to a position diametrically opposite the star nut 56 by rotating the drum and wheel to the position as shown in FIG. 2. In this position, the tool 85 may be inserted through one of the styling openings 75 and through the slot 82 for the purpose of engaging the star nut 56. The parallel walls of the slot 82 may be used as pry surface to provide the leverage required for rotating the nut 56 on the screw 53.

Preferably, the wheel to be adjusted is jacked up or otherwise elevated to permit the tire and drum to rotate freely. It may thus be rotated, while elevated, from a safe position alongside the wheel while determining the effect of the adjustment by noting the drag on the rotating wheel. In those instances, where the wheel is not provided with spokes or open spaces, it is a simple matter to remove the wheel and make the adjust through the slot 82.

Preferably, two slots 82 are formed through the radial wall portion 80 of the drum at 180° positions, as illustrated in FIG. 3, to provide balance and also to provide cooling ventilation for the brake. Additionally, the slots 82 may be used to flush out the interior of the brake mechanism with fresh water in the event that the brake or axle has been submerged in salt water or other corrosive water at any time, such as at the loading or unloading of a boat trailer.

The operation of the invention is largely self-evident from the foregoing description. The drum is provided with means defining arcuate or slot-like access openings 82 which extend through the radial portion 80 of the drum and into the interior, and which are movable into an opposed relation with the star adjusting nut. At that point a tool 85 may be inserted for the purpose of making the adjustment. Since the openings 82 extend outwardly toward the daylight, the adjustment may be performed more readily and with much less trouble than heretofore. While the access openings 82 may be sealed or closed such as with rubber stoppers, they may also, in most instances, be left open as the additional ventilation which would be provided therethrough is helpful in maintaining a cooler running brake.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. In a drum brake assembly in which brake shoes are mounted on a backing plate for co-action with a brake drum rotatably mounted on an axle, and in which a mechanical brake adjuster has a movable component for adjusting the clearance of the brake shoes with a braking surface of the brake drum, the improvement comprising:

said brake drum having a generally radial portion in spaced relation to said backing plate and an axial portion overlying with and defining said braking surface for co-action with the brake shoes, and means in said generally radial portion defining an access opening therethrough, said access opening being alignable with said brake adjuster movable component by rotating said brake drum on said axle to a position where said access opening is in generally opposed relation to the position of said movable component, said access opening having a size sufficient to provide for the insertion of an adjusting tool therethrough for co-acting with said movable component for adjusting the clearance of said shoes with said braking surface.

2. The improvement of claim 1 in which said access opening is formed in the shape of an elongated slot, the longer axis of which extends normal to a radius line from the center of said drum.

3. The improvement of claim 2 in which said access opening longer axis subtends an angle of approximately 16° of arc and said opening has a width measured radially of said drum of between 0.3 and 0.5 inch.

4. The improvement of claim 1 in which said access opening is a first access opening, and further comprising a second access opening in said drum radial portion positioned diametrically opposite said first access opening.

5. The improvement of claim 1 in which said drum is further formed with a plurality of wheel mounting bolts arranged in a bolt circle and extending through said generally radial portion, and said access opening is arcuately offset from a radial reference line extending from the axle center of said drum through one of said mounting bolts.

* * * * *